United States Patent [19]
Turcotte

[11] 3,923,402
[45] Dec. 2, 1975

[54] METHOD AND APPARATUS FOR ALIGNING PAPER MACHINERY
[75] Inventor: Paul Turcotte, Mobile, Ala.
[73] Assignee: Beloit Corporation, Beloit, Wis.
[22] Filed: Jan. 10, 1973
[21] Appl. No.: 322,414

[52] U.S. Cl. .................... 356/152; 356/1; 356/138; 356/141; 356/172; 33/286
[51] Int. Cl.² ......................................... G01B 11/26
[58] Field of Search ....... 356/1, 138, 141, 152, 172; 33/284, 286

[56] References Cited
UNITED STATES PATENTS
| | | | |
|---|---|---|---|
| 3,202,040 | 8/1965 | Burkhart | 356/1 |
| 3,471,234 | 10/1969 | Studebaker | 356/138 |
| 3,588,249 | 6/1971 | Studebaker | 356/172 |
| 3,705,772 | 12/1972 | Andreas | 356/5 |

FOREIGN PATENTS OR APPLICATIONS
| | | | |
|---|---|---|---|
| 1,181,162 | 2/1970 | United Kingdom | 356/141 |

Primary Examiner—Richard A. Farley
Assistant Examiner—S. C. Buczinski
Attorney, Agent, or Firm—Hill, Gross, Simpson, Van Santen, Steadman, Chiara & Simpson

[57] ABSTRACT

Method and apparatus for aligning paper machinery including a laser for projecting a reference beam transversely of the machine which can be used for placing and aligning rollers, shoes and other parts of the machine and wherein the laser is provided with a method and apparatus for aligning its reference relative to a pair of bench marks.

1 Claim, 6 Drawing Figures

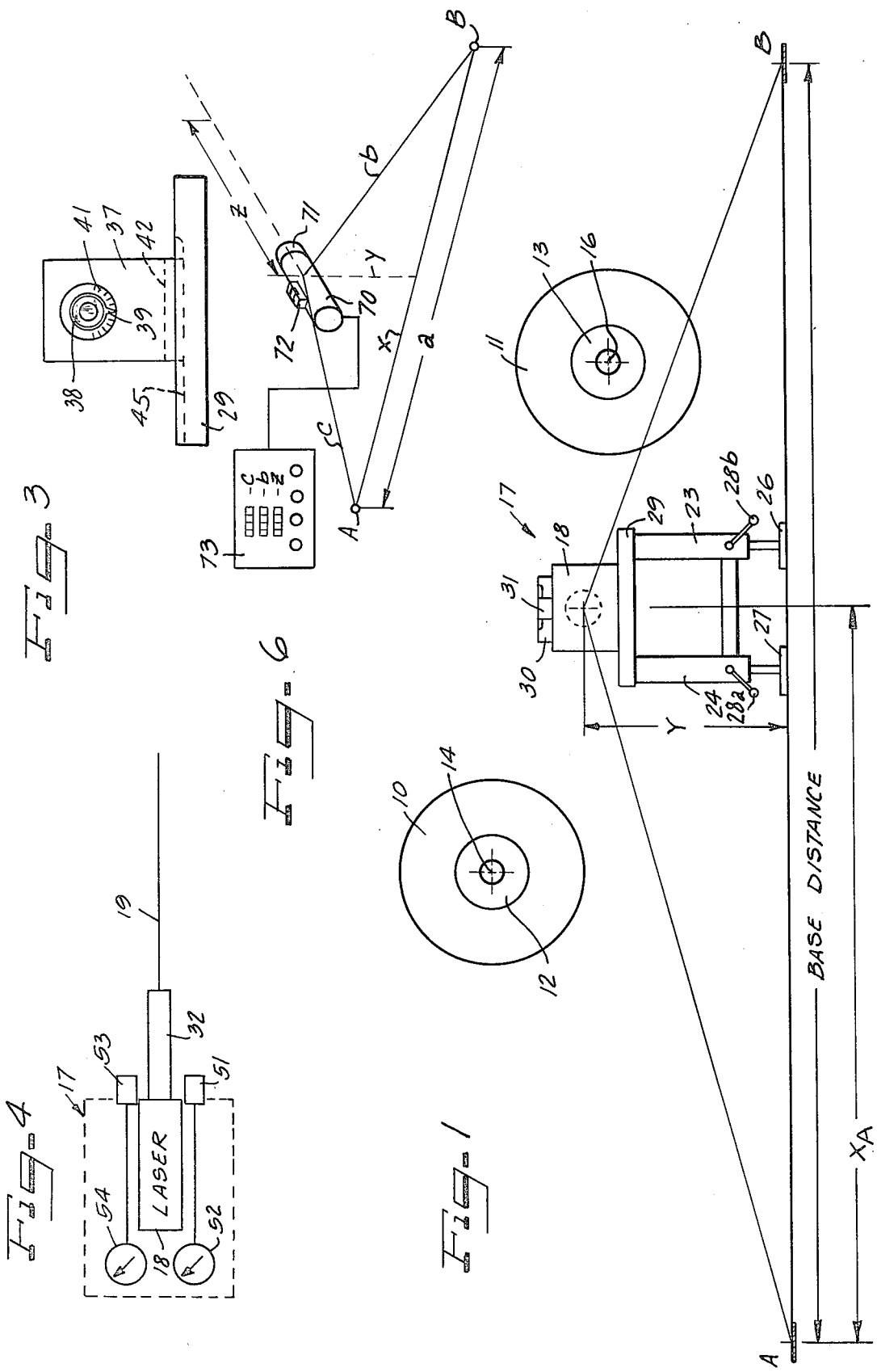

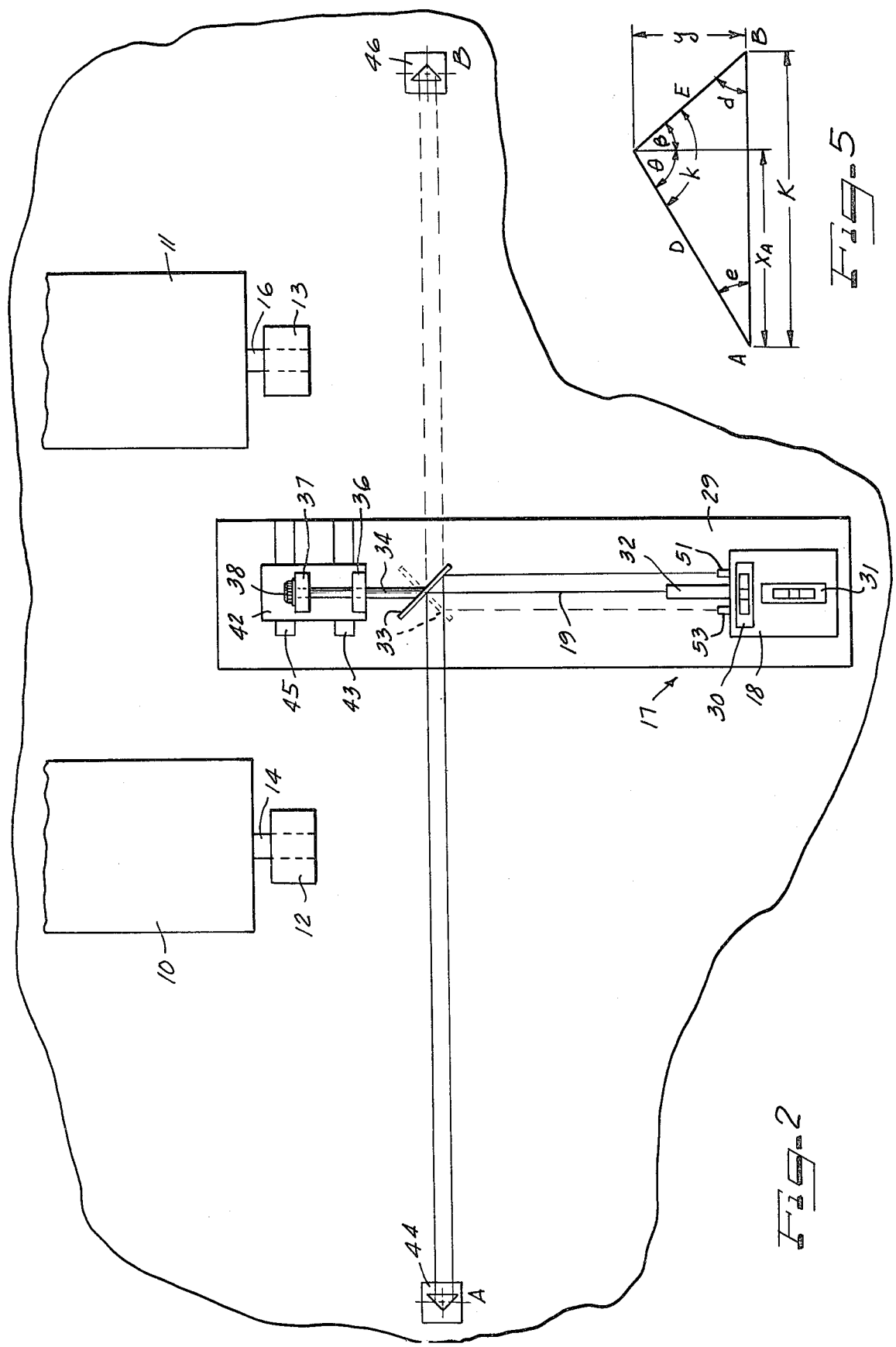

METHOD AND APPARATUS FOR ALIGNING PAPER MACHINERY

BACKGROUND OF THE INVENTION

1. Field of the Invention

This invention relates in general to method and apparatus for aligning paper machinery.

2. Description of the Prior Art

Paper machinery as well as other machinery must be accurately aligned during installation and operation and generally surveying techniques such as the use of a transit and a tape have been used for installing such machines. Since such machines extend for many feet from the first portion of the machine, the tolerances and inaccuracies of placement of various parts are additive resulting in substantial errors occurring by the time the last portion of the machine is installed.

SUMMARY OF THE INVENTION

The present invention provides a method and apparatus for aligning a paper machine or other device in which a laser beam is projected transversely across the machine which can be used to visibly measure up and down in the Y direction and to either side in the X direction for proper installation of parts of the machine. The laser beam is accurately positioned relative to a pair of bench marks by projecting a pulsed laser beam transversely of the reference beam to the bench marks and determining the distance from the laser beam to the bench marks. The determination of the two distances from the laser beam to the bench marks allows the X and Y coordinates of the laser beam relative to the bench marks to be calculated such that inaccuracies and tolerances are not additive but are substantially eliminated.

The laser generator is initially indexed relative to the two bench marks and then the reference beam is projected for accurate measurements therefrom.

BRIEF DESCRIPTION OF THE DRAWINGS

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

FIG. 1 is a side plan view of the aligning apparatus of the invention;

FIG. 2 is a top plan view of the aligning apparatus of the invention;

FIG. 3 is a detailed view of the structure for measuring the angles to the bench marks;

FIG. 4 is a schematic view showing the laser and aligning indicators;

FIG. 5 illustrates the computation to determine the coordinates; and

FIG. 6 illustrates a modification.

DESCRIPTION OF THE PREFERRED EMBODIMENTS

FIG. 1 is a side plan view of the aligning apparatus of this invention which is used to project a laser beam transversely of a machine which is to be installed for operation. For example, the machine to be installed might be a paper machine which comprises many sections extending over hundreds of feet and in which each section must be aligned and positioned. As illustrated in FIGS. 1 and 2, a pair of bench marks A and B are separated from each other in the longitudinal direction of the machine. The machine might comprise rollers 10 and 11 mounted on suitable bearings 12 and 13, respectively. The centers 14 and 16 of the rollers 10 and 11 must be aligned accurately in both the X, Y and Z directions. The method and apparatus for aligning is designated generally as 17 and comprises a laser beam generator 18 which projects a laser beam 19 transversely of the machine as shown in FIG. 4. The laser generator 18 is mounted on a slidable stand 21 which has legs 23 and 24. The legs 23 and 24, as well as the legs at the other end of the machine not shown in FIG. 1, have adjustable feet 26 and 27 that may be moved in the vertical direction by crank arms 28a and 28b so as to move the bed 29 upon which the laser 18 rests in the vertical direction. A pair of levels 30 and 31 are mounted on the laser 18 and may be used for leveling the laser relative to the base plate 29 as the feet are adjusted in legs 23 and 24.

A 45° reflecting mirror 33 is supported on a shaft 34 mounted on suitable bearings 36 and 37, and a knob 38 having a pointer 39 is mounted on shaft 34 and can be read against a protractor 41. The mirror 33 and its supporting assembly is mounted on a base plate 42 which has projections that ride in keyways 43 and 45 of the supporting plate 29, as best shown in FIG. 2, so that the mirror 33 may be moved to a position such that it does not reflect the laser beam.

In use, a pair of corner cube prism reflectors 44 and 46 are accurately positioned on the bench marks A and B and the mirror support 42 is moved such that the shaft 34 and the mirror 33 is aligned with the laser beam 19. The plate 29 is leveled by observing the levels 30 and 31. The knob 38 is rotated such that the laser beam 19 is reflected at 90° by the mirror 33 until it engages the reflector 44 and the reflected beam returns to the mirror 33 and is received by detector 51 which may be connected to an indicator 52. The detector 51 might be a photocell, for example. The angle $\theta$ shown in FIG. 5 will be indicated by the pointer 39. Then the knob 38 is rotated to move mirror 33 such that it projects the laser beam to the reflector 46 and the beam is reflected back by the reflector 46 to the mirror 33 and is received in a detector 53 which is connected to indicator 54 to determine angle $\beta$. The reflectors 44 and 46 are triangular in shape and have the property that the reflected beam is reflected parallel to the incident beam but offset therefrom by a known distance. This allows the positions of the detectors 51 and 53 to be placed out of the emerging beam from the laser as shown in FIG. 2, for example. By measuring angles $\theta$ and $\beta$ in FIG. 5, the height Y of the laser beam may be calculated as shown by equation 1:

$$Y = K \frac{\sin(d+e)}{\sin d \sin e} \quad (1)$$

The $X_A$ dimension from the bench mark A to the point immediately below the laser beam shown in FIGS. 1 and 5 can be calculated from equation 2:

$$X_A = \frac{Y}{\tan e} \quad (2)$$

The angles e and d are known because angle $e = 90° - \theta$ and angle $d = 90° - \beta$.

Thus, the X and Y coordinates of the laser beam 19 are determined. The slide member 37 is moved relative to the table 29 to move the mirror 33 out of the path of the laser beam 19 and the laser beam 19 will extend precisely at right angles to the base line between the bench marks A and B in a horizontal direction. Workmen can then align the rollers 10 and 11 of the machine to be installed by using the visible laser beam 19 as a reference and can then measure in the horizontal and vertical directions from it so as to locate the axes 14 and 16 of the rollers 10 and 11, respectively. It is to be realized, of course, that the rollers may be positioned at different Y values as shown in FIG. 1.

Thus, the method and apparatus of the present invention allows a transverse laser beam to be accurately aligned and used as a reference. Measurements from the laser beam will allow very accurate alignment of the machine being installed.

Although in the illustrated examples, the laser generator is mounted between the bench marks, it is to be realized that it may be positioned to the left or right of both bench marks and the angles $\theta$ and $\beta$ measured. The X and Y dimensions can be calculated from these angles knowing the distance between the two bench marks. Also, if base plate 29 is transparent or if the reflector is supported from an overhead bracket and the plate 29 shortened, one of the bench marks may be beneath the reflector 33 during alignment and referencing.

An alternate method and apparatus is illustrated in FIG. 6 in which a laser 70 may be of the type described in the article "Working Lasers" by James W. Nulet, Design News of Sept. 6, 1971, which includes built-in penta-prisms 71 which can be resolved about the axis to locate the bench marks A and B. A level 72 levels the beam. Since the distance $a$ between the bench marks is known as well as the dimensions Y and X of the laser, the dimensions $c$ and $b$ can be calculated. The laser 70 may be connected to a computer 73 which calculates and indicates the dimensions $c$ and $b$.

Although the invention has been described with respect to preferred embodiments it is not to be so limited as changes and modifications may be made which are within the full intended scope as defined by the appended claims.

I claim as my invention:

1. The method of aligning remote axes parallel to a laser bema which has a normal position which extends perpendicular to a base line through a pair of bench marks and at a determinable height and at a determinable horizontal distance from at least one of said bench marks comprising the steps of:

reflecting said laser beam at a first angle and perpendicular to its normal position such that the reflected beam points at one fo said bench marks, reflecting said laser beam at a second angle at right angles to its normal position such that the reflected beam points at the other of said bench marks, determining the height of the normal position of the beam above said base line from said first and second angles and the known distance between said bench marks, determining the horizontal distance between one of said bench marks and the projection of the normal position of the beam on said base line from said height of the normal position of the beam and one of said first and second angles and, aligning remote axes parallel to the laser beams said normal position.

* * * * *